W. BARR, Jr.
ACCOUNT FILE.
APPLICATION FILED AUG. 14, 1909.
996,197.
Patented June 27, 1911.
2 SHEETS—SHEET 1.
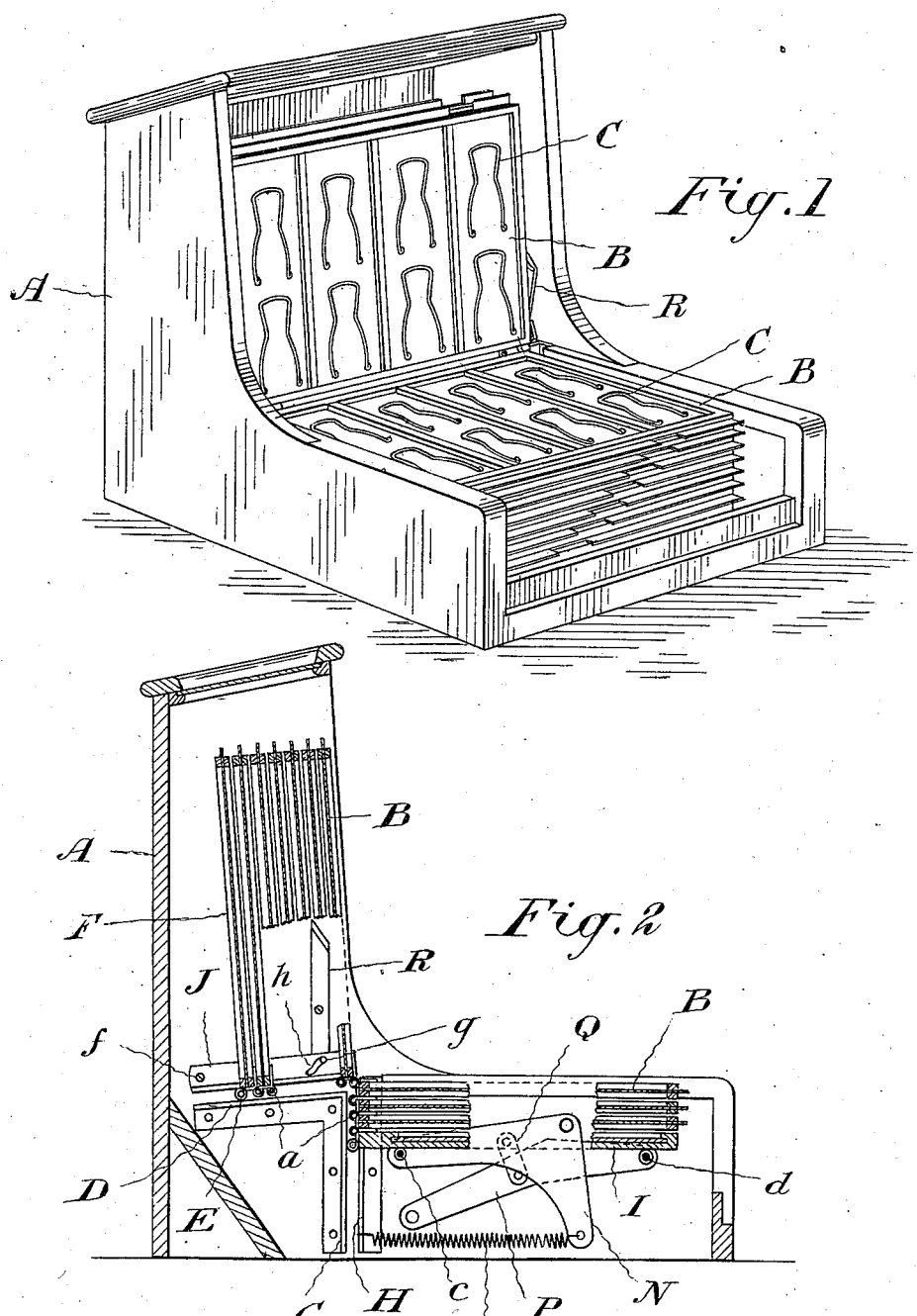
WITNESSES:
W. J. McMillan
E. P. Hall
INVENTOR.
Wilson Barr Jr.
BY Ridout & Maybee
ATTORNEY.

W. BARR, Jr.
ACCOUNT FILE.
APPLICATION FILED AUG. 14, 1909.
996,197.
Patented June 27, 1911.
2 SHEETS—SHEET 2.
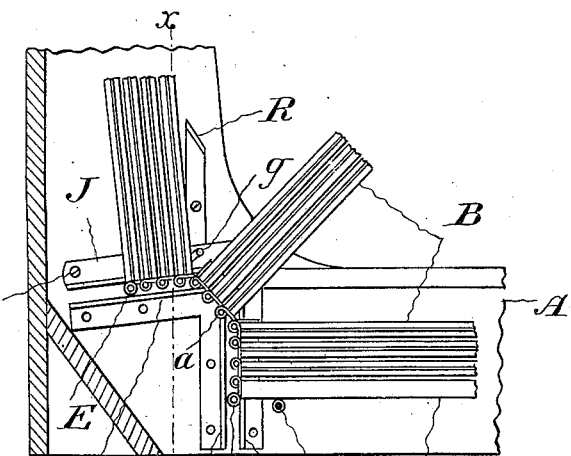
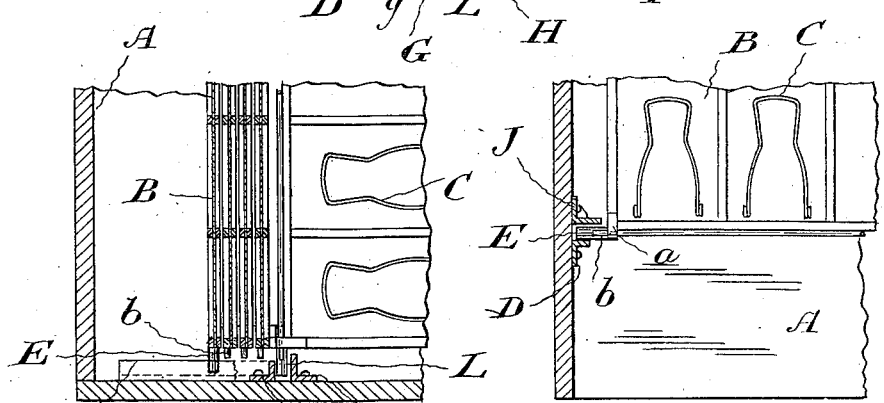
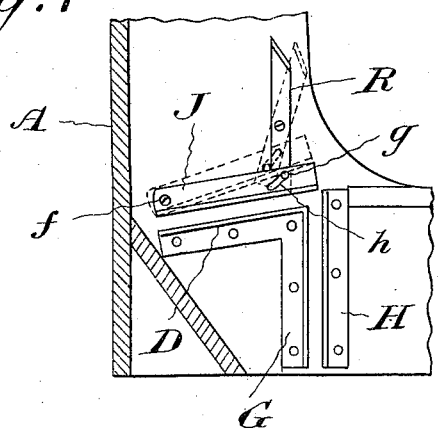
WITNESSES:
H. G. McMillan
E. P. Hall
INVENTOR.
Wilson Barr Jr.
BY Ridout & Maybee
ATTORNEY.

UNITED STATES PATENT OFFICE.

WILSON BARR, JR., OF HAMILTON, ONTARIO, CANADA.

ACCOUNT-FILE.

996,197.  Specification of Letters Patent.  Patented June 27, 1911.

Application filed August 14, 1909. Serial No. 512,853.

*To all whom it may concern:*

Be it known that I, WILSON BARR, Jr., of the city of Hamilton, in the Province of Ontario, Canada, have invented certain new and useful Improvements in Account-Files, of which the following is a specification.

This invention relates to files in which account slips are filed on stiff leaves suitably supported so that any given leaf is immediately accessible. In designing such a file I have two main objects in view, first that each leaf when being used shall occupy exactly the same position as any other leaf when said other leaf is in use; and second, that there shall be no sliding movement of one leaf or another tending to dislodge or spoil the accounts. The usual objects of cheapness and durability of construction, and reliability of action are of course also sought.

I attain my objects by the constructions hereinafter particularly described and illustrated in the accompanying drawings, in which—

Figure 1 is a perspective view of my improved account file. Fig. 2 is a vertical section of the same. Fig. 3 is a vertical section of the apparatus showing a bunch of leaves being turned from the vertical to the horizontal position. Fig. 4 is a plan view of part of the apparatus showing the vertical leaves in section. Fig. 5 is a vertical section on line $x$—$y$, Fig. 3, of part of the apparatus showing the horizontal tracks and part of the vertical leaf. Fig. 6 is a view similar to Fig. 3 with the leaves removed.

In the drawings like letters of reference indicate corresponding parts in the different figures.

A is the casing preferably of L shape as shown.

B are a series of account filing leaves which are of ordinary construction and are provided with the account holding clips C. These leaves are pivotally connected at their lower or rearward edges by means of the hinges $a$ so that one or more of the said leaves may occupy either a substantially vertical or a substantially horizontal position. I aim particularly in the present invention to so arrange the apparatus that when any leaf occupies the position at the front of the vertical leaves or at the top of the horizontal leaves that it will occupy substantially the same position as any other leaves under like circumstances. I accomplish this by arranging it that the leaves, when in a vertical position, are restricted substantially to a backward or forward movement and when horizontal are restricted substantially to a vertical movement, the guiding means being so arranged that one or more of the leaves may be turned freely from the vertical to the horizontal position, or vice versa.

To guide the leaves when vertical I provide the pair of tracks D which, though approximately horizontal, will usually incline somewhat toward the rear to give the leaves a slight rearward inclination. The tracks D are engaged by the projections E which are preferably rollers journaled on the last leaf F. The leaves when in their horizontal position are guided by the substantially vertical tracks G and H which are located adjacent to the forward ends of the tracks D.

I is a movable table being normally vertically spring pressed, as hereinafter described, and provided with projections L, preferably rollers, which run in the guide way formed by the tracks G and H. Theoretically this table may be considered as the first leaf. It will be noted that the vertical pressure of the table tends to push up the front vertical leaf. This tendency is restrained by the use of a pair of tracks J close to and substantially parallel to the tracks D. These tracks are engaged by the projections $b$ located at the hinged edge of each intermediate leaf.

It will be noted that the tracks J and H extend inwardly closer to the leaves than the tracks D and G. The projections E and L on the last leaf and the table are longer than the projections $b$ on the intermediate leaves, consequently the projections E may engage both tracks D and J, and the projections L both tracks G and H, while the projections $b$ engage only the tracks J and H. Consequently when a bunch of leaves is turned from the vertical to the horizontal position or vice versa, as indicated in Fig. 3, the projections $b$ will clear the tracks D and G, and thus do not interfere with the movement of the leaves. They are, however, by their engagement with the tracks J and H effective in preventing upward displacement of the leaves when vertical, or a forward displacement of the leaves when horizontal. While any suitable means may be provided for yieldingly supporting the table I, yet I prefer the mechanism shown.

A pair of bent levers N are journaled on the sides of the casing and are connected by the cross bar c. A coil spring O connected to one end of this lever and to the casing presses the cross bar up against the under side of the table. A second pair of bent levers P are pivoted on the sides of the casing and are connected by a cross bar d engaging the under side of the table I at the opposite end to the cross bar c. These bent levers P are connected with the bent levers N by means of the links Q whereby they move together and impart a similar movement to each of the cross bars c and d. From this construction it follows that as each leaf is turned down from a vertical to a horizontal position that the table is depressed the thickness of one leaf, the next vertical leaf going forward to the position formerly occupied by the leaf just turned down. It follows then that when either side of a leaf is exposed the exposed side occupies the same position as the similarly exposed side of every other leaf in the file.

In order that the whole bunch of leaves may be withdrawn from the file I preferably hinge the upper track J at f and provide each track with a lever R fulcrumed on the side of the gap provided with a pin g engaging a slot h in the track. By operating this lever R the track may be either locked down or else raised, as shown in dotted lines in Fig. 6. When the tracks J are thus lifted out of the way, the whole bunch of leaves may be readily withdrawn as all the projections on the leaves will then pass out through the gap thus formed where the horizontal and vertical tracks meet.

It will be seen that the essential principle underlying this invention lies in connecting the leaves so that one or more of them may occupy either a substantially vertical or a substantially horizontal position and in so guiding the leaves that when vertical they are restricted to a substantially horizontal movement and when horizontal to a substantially vertical movement, the guiding means being adapted to permit of the leaves being swung in a vertical position to the horizontal, and vice versa. Consequently various modifications of the details of construction might be made which would still fall within the scope of my invention.

What I claim as my invention is:—

1. In an account file the combination of a plurality of account holding leaves pivotally connected at their lower edges whereby one or more of said leaves may occupy either a substantially vertical or a substantially horizontal position; guiding means adapted to restrict the leaves substantially to a backward or forward movement only when they are substantially vertical; guiding means tending to restrict the leaves to a substantially vertical movement only when they are horizontal; and yielding means tending to press the leaves upward when they are in the substantially horizontal position; the guiding means being adapted to permit of the leaves being swung from the vertical position to the horizontal, and vice versa.

2. In an account file the combination of a plurality of account holding leaves pivotally connected at their lower edges whereby one or more of said leaves may occupy either a substantially vertical or a substantially horizontal position; substantially horizontal guiding and supporting means for the last leaf when vertical; means for preventing the front leaf, when vertical, from moving upward; substantially vertical guides for the leaves when horizontal; and yielding means tending to press the leaves upward when they are in the substantially horizontal position, the guiding means being adapted to permit of the leaves being swung from the vertical position to the horizontal, and vice versa.

3. In an account file the combination of a plurality of account holding leaves pivotally connected at their lower edges whereby one or more of said leaves may occupy either a substantially vertical or a substantially horizontal position; substantially horizontal guide tracks; projections on the last leaf riding on said tracks; a second pair of tracks substantially parallel to the first with the under side of which each leaf may engage; a pair of substantially vertical tracks; projections vertically movable with the first leaf adapted to engage the forward sides of the vertical tracks and yielding means tending to press the leaves upward when they are in the substantially horizontal position.

4. In an account file the combination of a plurality of account holding leaves pivotally connected at their lower edges whereby one or more of said leaves may occupy either a substantially vertical or a substantially horizontal position; substantially horizontal guide tracks; projections on the last leaf riding on said tracks; a second pair of tracks substantially parallel to the first with the under side of which each leaf may engage; a pair of substantially vertical tracks; projections vertically movable with the first leaf adapted to engage the forward sides of the vertical tracks; a second pair of vertical tracks substantially parallel to the first vertical tracks and with the rearward side of which the leaves may engage when horizontal; and yielding means tending to press the leaves upward when they are in the substantially horizontal position.

5. In an account file the combination of a plurality of account holding leaves pivotally connected at their lower edges whereby one or more of said leaves may occupy either a substantially vertical or a substantially horizontal position; substantially horizontal guide tracks; projections at the hinge edge of the last leaf riding on said tracks; a second pair of tracks adjacent and substantially parallel to the first mentioned tracks and extending inwardly closer to the leaves than said tracks; projections from the hinge edge of each intermediate leaf adapted to engage the under side of the second pair of tracks only; guiding means tending to restrict the leaves to a substantially vertical movement only, when they are horizontal; and yielding means tending to press the leaves upward when they are in the substantially horizontal position, the guiding means being adapted to permit of the leaves being swung from the vertical position to the horizontal and vice versa.

6. In an account file the combination of a plurality of account holding leaves pivotally connected at their lower edges whereby one or more of said leaves may occupy either a substantially vertical or a substantially horizontal position; substantially horizontal guide tracks; projections at the hinge edge of the last leaf riding on said tracks; a second pair of tracks adjacent and substantially parallel to the first mentioned tracks and extending inwardly closer to the leaves than said tracks; projections from the hinge edge of each intermediate leaf adapted to engage the under side of the second pair of tracks only; two pairs of tracks forming vertical guide ways; projections vertically movable with the first leaf adapted to engage in said guide ways, the tracks forming said guide ways being shaped and proportioned to escape contact with the projections on the intermediate leaves as said leaves are turned from the vertical to the horizontal position, and vice versa.

7. In an account file the combination of a plurality of account holding leaves pivotally connected at their lower edges whereby one or more of said leaves may occupy either a substantially vertical or a substantially horizontal position; substantially horizontal guide tracks; projections at the hinge edge of the last leaf riding on said tracks; a second pair of tracks adjacent and substantially parallel to the first mentioned tracks, and extending inwardly closer to the leaves than said tracks; projections from the hinge edge of each intermediate leaf adapted to engage the under side of the second pair of tracks only; a liftable section at the forward end of each of the second pair of tracks; means for locking said sections in place; guiding means tending to restrict the leaves to a substantially vertical movement only, when they are horizontal; and yielding means tending to press the leaves upward when they are in the substantially horizontal position the guiding means being adapted to permit of the leaves being swung from the vertical position to the horizontal, and vice versa.

Hamilton, this 28th day of November, 1910.

WILSON BARR, Jr.

Signed in the presence of—
S. J. WASHINGTON,
W. J. JEFFREY.

---

Copies of this patent may be obtained for five cents each, by addressing the "Commissioner of Patents, Washington, D. C."